United States Patent [19]
Mademann

[11] Patent Number: 5,943,327
[45] Date of Patent: Aug. 24, 1999

[54] METHOD AND ARRANGEMENT FOR TRANSMITTING DATA BETWEEN A CELLULARLY CONSTRUCTED MOBILE RADIOTELEPHONE NETWORK AND A MOBILE SUBSCRIBER STATION

[75] Inventor: Frank Mademann, Strausberg, Germany

[73] Assignee: Siemens Aktiengesellschaft, Munich, Germany

[21] Appl. No.: 08/734,951

[22] Filed: Oct. 23, 1996

[30] Foreign Application Priority Data

Oct. 23, 1995 [DE] Germany .......................... 195 39 374

[51] Int. Cl.⁶ .............................. H04Q 7/00; H04B 7/26
[52] U.S. Cl. .................................. 370/329; 455/450
[58] Field of Search ................................... 370/329, 336, 370/337, 347, 328, 345, 522, 503, 348, 349; 455/450, 455, 456

[56] References Cited

U.S. PATENT DOCUMENTS

| | | | |
|---|---|---|---|
| 4,930,124 | 5/1990 | De Boisseron et al. ................ | 370/503 |
| 5,502,721 | 3/1996 | Pohjakallio ............................. | 370/336 |
| 5,519,760 | 5/1996 | Borkowski et al. .................... | 455/456 |

FOREIGN PATENT DOCUMENTS 44 02 903 A1  3/1995  Germany .
WO 95/21492  10/1995  WIPO .

OTHER PUBLICATIONS

GSM—Funkschnittstelle—Peter Smolka, Bonn elecom Apr. 1993 p. 17–24.

Primary Examiner—Michael Horabik
Assistant Examiner—Kevin C. Harper
Attorney, Agent, or Firm—Hill & Simpson

[57] ABSTRACT

A transmission channel (TCH/F) of the current radio cell, in which the mobile subscriber station (MS) is located, is directly assigned to the mobile subscriber station (MS) via a signaling channel·(CCCH) by the mobile radiotelephone network (GPNW), given a request for transmission of data packets (DAT1, DAT2) in the reverse transmission direction. The direct assignment of the transmission channel of the current radio cell to the mobile subscriber station enables the transmission of data packets without a previous sending of the paging message, and effects by comparison a shortening of the initial delay in the data packet transmission in the direction of the mobile subscriber station. Moreover, by omission of the paging message, the signaling load can be reduced during data packet transmissions in the reverse transmission direction, which is particularly advantageous given a plurality of brief data packet transmissions.

16 Claims, 2 Drawing Sheets

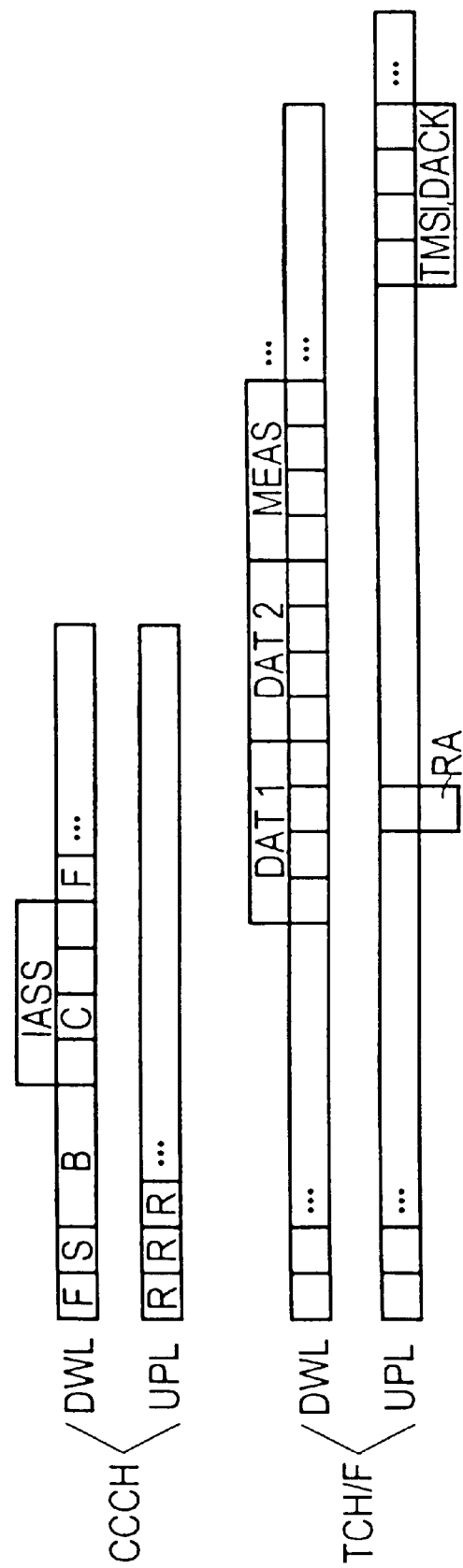

METHOD AND ARRANGEMENT FOR TRANSMITTING DATA BETWEEN A CELLULARLY CONSTRUCTED MOBILE RADIOTELEPHONE NETWORK AND A MOBILE SUBSCRIBER STATION

BACKGROUND OF THE INVENTION

The present invention concerns a method and an arrangement for transmitting data between a mobile radiotelephone network constructed in cellular fashion from several radio cells and a mobile subscriber station, using a time division multiplex transmission method.

In cellular mobile radiotelephone networks, such as for example the digital mobile radiotelephone network according to the GSM standard (Global System for Mobile Communication), speech and data signals are received and transmitted via a uniform radio interface. In the article "GSM-Funkschnittstelle" by P. Smolka, telekom praxis, 4/93, pp. 17 to 24, the elements and functions of radio transmission between mobile subscriber stations and the GSM mobile radiotelephone network are specified. Given a request for the transmission of data in the reverse transmission direction, from the mobile radiotelephone network to the mobile subscriber station, at first a radio paging message is transmitted into the radio cells of the local area in which the mobile subscriber station is currently located (paging). The paging of the mobile subscriber station thereby ensues via a separate radio paging channel and is answered by the mobile subscriber station via a random access channel. After answering the page, a transmission channel for transmitting speech or data is assigned to the mobile subscriber station.

The transmission of the paging message into the radio cells means a high load both for the signaling components of the network and for the signaling channels in the radio cells. The signaling load increases particularly when a plurality of short data packets are to be transmitted in burst fashion according to a separate packet data service (general packet radio service) in the GSM mobile radiotelephone network. The signaling load also climbs proportionally as the number of radio cells in a local area becomes larger.

SUMMARY OF THE INVENTION

It is an object of the present invention to provide a method and an arrangement for transmitting data between a cellularly constructed mobile radiotelephone network and a mobile subscriber station, by means of which the signaling load during the transmission of data packets in the reverse transmission direction can be reduced and the setup time for the connection setup can be shortened.

In general terms the present invention is a method for transmitting data between a mobile radiotelephone network, constructed in cellular fashion from several radio cells, and a mobile subscriber station using a time division multiplex method. Given a request for transmission of one or several data packets in the reverse transmission direction to the mobile subscriber station, a transmission channel of the current radio cell in which the mobile subscriber station is located is directly assigned to the mobile subscriber station by the mobile radiotelephone network via a signaling channel.

Advantageous developments of the present invention are as follows.

Information concerning the current radio cell in which the mobile subscriber station is located is derived from a data packet that was previously transmitted in the forward transmission direction by the mobile subscriber station or is derived from signaling information.

A random access is transmitted by the mobile subscriber station via the directly assigned transmission channel in the forward transmission direction during the reception of the data packets sent in the reverse transmission direction. It is responded to with the transmission of measurement values by the mobile radiotelephone network via the radio interface in the reverse transmission direction.

The sending of the data packets is initiated by the mobile radiotelephone network during or after a synchronization of the mobile subscriber station to the directly assigned transmission channel.

The direct assignment of the transmission channel for the transmission of the data packets according to a packet data service is caused by a separate service network node in the mobile radiotelephone network. The assignment is communicated to the mobile subscriber station in a signaling message via the signaling channel.

The present invention is also an arrangement for transmitting data between a mobile radiotelephone network, constructed in cellular fashion from several radio cells, and a mobile subscriber station, using a time division multiplex transmission method. Control installation is provided in the mobile radiotelephone network, which station directly assigns a transmission channel of the current radio cell in which the mobile subscriber station is located to the mobile subscriber station via a signaling channel, given a request for the transmission of one or several data packets in the reverse transmission direction to the mobile subscriber station.

A service network node is provided in the mobile radiotelephone network, which node causes the transmission of the data packets via the directly assigned transmission channel according to a packet data service.

Accordingly, upon a request for the transmission of one or several data packets in the reverse transmission direction via a signaling channel, a transmission channel of the current radio cell in which the mobile subscriber station is located is directly assigned to the mobile subscriber station by the mobile radiotelephone network. The direct assignment of the transmission channel of the current radio cell to the mobile subscriber station enables the transmission of data packets without a previous transmission of the paging message, and brings about by comparison a shortening of the initial delay in the data packet transmission in the direction of the mobile subscriber station. Moreover, by means of the omission of the paging message, the signaling load during data packet transmissions to the mobile subscriber station can be reduced, which is particularly advantageous given the plurality of brief data packet transmissions.

It is advantageous that in the radiotelephone network an information about the current radio cell in which the mobile subscriber station is located is derived from a data packet that is previously transmitted from the mobile subscriber station in the forward transmission direction or from a signaling information.

It is also advantageous that a random access is transmitted by the mobile subscriber station via the directly assigned transmission channel in the forward transmission direction during the reception of the data packets transmitted in the reverse direction, and is answered with the transmission of measurement values via the radio interface in the reverse transmission direction by the mobile radiotelephone network.

It is advantageous that the transmission of the data packets on the directly assigned transmission channel is begun during or after synchronization of the mobile subscriber station to the assigned transmission channel.

It is furthermore advantageous that the direct assignment of the transmission channel for the transmission of data packets according to a packet data service is caused by a separate service network node in the mobile radiotelephone network, and is communicated to the mobile subscriber station in a signaling message via the signaling channel.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 depicts the frame structure of a transmission frame for the transmission of signaling information in the signaling channel, and of useful information and control information in the directly assigned transmission channel.

DESCRIPTION OF THE PREFERRED EMBODIMENTS

Figure 1:
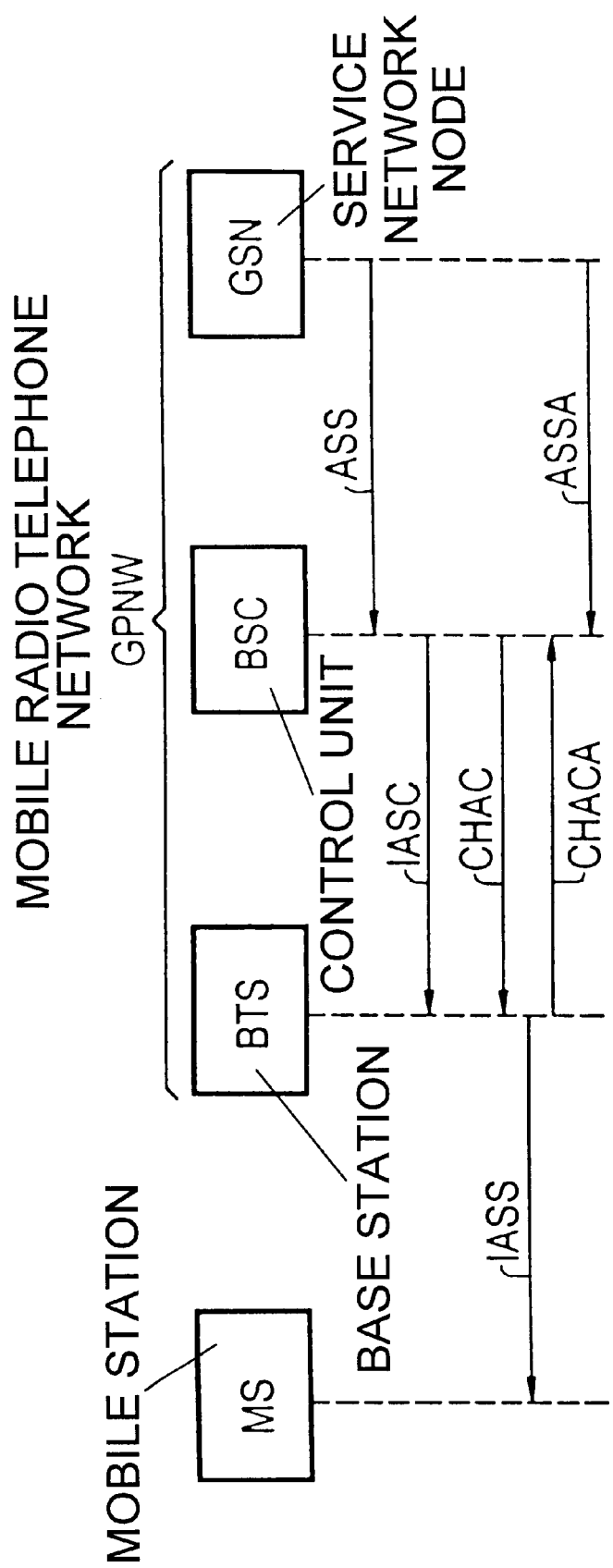
FIG. 1 depicts the message flow during the signaling of the direct assignment of a transmission channel for data packet transmission in the reverse direction of transmission.

FIG. 1 shows, in a message flow diagram, the signaling for the direct assignment of a transmission channel, via which one or several data packets are transmitted according to a packet data service (general packet radio service) between a mobile radiotelephone network GPNW and a mobile subscriber station MS in the reverse transmission direction (downlink). The mobile radiotelephone network GPNW, which is suited for speech and data transmission according to the GSM standard, is a digital network constructed from a plurality of radio cells. However, the present invention can also be used in an analog network. The speech and data signals are exchanged between the mobile subscriber station MS and a radio transmission system, which consists of base transceiver stations BTS, respectively arranged in the radio cells, and base station control units BSC, via a uniform air interface. A switching system having, as is standard, several mobile exchanges is connected with the radio transmission system, which mobile exchanges, respectively responsible for a local area, control and carry out the connection setup for outgoing and incoming calls and during data transmissions. Visitor registers are coupled with the mobile exchanges, which registers, as decentral subscriber databases, temporarily store the subscriber data of the mobile subscribers located in their local areas. The subscriber data of all mobile subscribers registered in the mobile radiotelephone network are stored in at least one central subscriber database, the home register. The mobile exchanges, the visitor registers and the home registers form the switching system in the digital cellular mobile radiotelephone network according to the GSM standard.

The mobile radiotelephone network GPNW is provided with a separate service network node GSN for the processing of the packet data service, in which one or several data packets are respectively transmitted burst by burst in data bursts. The separate service network node GSN is preferably a component of the respective mobile exchange of the switching system. Further alternatives result from the arrangement of the service network node GSN, either in the radio transmission system or additionally to the mobile exchanges in the switching system. In the case of a request in the mobile radiotelephone network for the transmission of the data packets, the responsible visitor register in the local area of the mobile subscriber station MS is polled, and a cell identification that identifies the current radio cell is thereby prepared. The cell identification is respectively sent along during the transmission of data packets by the mobile subscriber station in the direction of the mobile radiotelephone network, and is stored in the respective visitor register, which can be read from the subscriber database. It is also possible that signaling information for the identification of the radio cell is previously supplied to the network in the forward transmission direction from the current radio cell in which the mobile subscriber station MS is located. In this way, the network is informed about the current radio cell without requiring a data packet transmission.

With the knowledge of the current radio cell, a message ASS for base station control BSC is transmitted from the service network node GSN, in which message the assignment of a transmission channel for the transmission of the data packets via the air interface to the mobile subscriber station MS is requested. On the basis of the request received in the message ASS, a message IASC is transmitted by the base station control BSC to the base transceiver station BTS, which message causes the direct assignment of a transmission channel of the known current radio cell to the addressed mobile subscriber station MS without transmitting a radio page message on the standardly provided paging channel. A message IASS is thereupon transmitted between the base transceiver station BTS and the mobile subscriber station MS, via a signaling channel of the air interface. In the message IASS, a transmission channel of the current radio cell is directly assigned without its being necessary to call the addressed mobile subscriber station beforehand via the paging channel. The assigned transmission channel is a duplex transmission channel for both transmission directions.

The omission of the transmission of the paging message, which is standardly directed to several radio cells in a local area, causes a reduction of the signaling load on the radio interface during the transmission of data packets in the direction of the addressed mobile subscriber station. A further advantage of the direct assignment of a transmission channel of the current radio cell lies in the shortening of the initial delay during the transmission of the data packets in relation to the alternatives, with previous transmission of the paging message in the reverse transmission direction.

The base transceiver station BTS receives a further message CHAC from the base station control BSC, with which message the assigned transmission channel for data packet transmission via the air interface is activated. As a response to the received message CHAC, a message CHACA is sent back to the base station control BSC by the base transceiver station BTS, in which message the activation of the directly assigned transmission channel of the base station control BSC is confirmed. The base station control BSC thereupon transmits, in the message ASSA, a confirmation of the request contained in the message ASS for the assignment of a transmission channel on the air interface back to the service network node GSN. A transmission channel of the current radio cell has thus been set up between the addressed mobile subscriber station MS and the mobile radiotelephone network GPNW directly without transmission of the paging message, on which channel the data packets of the separate packet data service can be transmitted in the direction to the mobile subscriber station earlier and with a reduced signaling expense. After a short waiting period, in which the mobile subscriber station MS has tuned itself to the directly assigned transmission channel, the transmission of the data packets by the mobile radiotelephone network GPNW to the mobile subscriber station MS via the directly assigned transmission channel begins. For secured data packet transmission, useful and control information are also transmitted in the forward transmission direction (uplink) by the mobile subscriber station MS to the mobile radiotelephone network GPNW. For this purpose, a random access ensues from the mobile subscriber station MS in the assigned transmission channel, in which access an information burst is transmitted to the base transceiver station BTS according to a random access method. The random access is carried out in the forward direction of transmission already during the transmission of the data packets, which began in the reverse direction of transmission. As a response to the information burst transmitted in the assigned transmission channel, the mobile radiotelephone network GPNW sends back several measurement values (for example, timing advance), which are the radio parameters, via the air interface, which permit the mobile subscriber station MS to send further information, such as, for example, temporary mobile subscriber identification numbers, in the forward transmission direction to the mobile radiotelephone network GPNW. The transmission of the measurement values in the reverse transmission direction thereby ensues between the data packets of the packet data service, which are transmitted in blocks. While the direct assignment of a transmission channel to the current radio cell, known to the mobile radiotelephone network, ensues on a signaling channel of the air interface, the measurement values prepared by the mobile radiotelephone network and the information coming from the mobile subscriber station, as well as the random access, are transmitted via the directly assigned transmission channel.

FIG. 2 shows the signaling channel CCCH (common control channel) and the assigned transmission channel TCH/F (traffic channel/full rate codec) respectively in the reverse transmission direction DWL (down link) and the forward transmission direction UPL (up link). The information exchanged on the air interface between the mobile subscriber station and the mobile radiotelephone network are transmitted in time slots (bursts) of different burst types according to a time division multiplex method, which are combined in a physical frame, the TDMA (time division multiple access) frame. The frames can be combined into multiframes, whereby useful message information and control information, as well as, signaling information, are contained in separate multiframes, of which several can in turn be combined into a higher-order superframe. The frame structure for the signaling channel CCCH in FIG. 2 shows a multiframe in which the signaling information for the reverse transmission direction DWL are transmitted in several frames F, S, B and C, and for the forward transmission direction UPL are transmitted in several frames R. The message IASS, with which the direct assignment of the transmission channel of the current radio cell is signaled in the reverse transmission direction to the mobile subscriber station by the mobile radiotelephone network, is for example, sent along as a signaling information, for example, in one or several frames C, on the air interface between the base transceiver station of the mobile radiotelephone network and the mobile subscriber station.

The frame structure of the directly assigned duplex transmission channel TCH/F comprises a plurality of frames for the transmission of traffic information in the reverse transmission direction DWL and in the forward transmission direction UPL. One or several data packets DAT1, DAT2 are thereby successively transmitted block by block to the mobile subscriber station in the reverse transmission direction DWL, while in the meantime the random access RA is transmitted as an information burst in the forward transmission direction UPL. Upon reception of the information burst RA sent by the mobile subscriber station, the mobile radiotelephone network sends back the measurement values MEAS in the reverse transmission direction DWL as a response, in order to ensure radio parameters for controlling the radio connection setup, thereby ensuring a secure data packet transmission, on the radio interface. Measurements are carried out on the radio interface for each connection to a mobile subscriber station, on the signaling channel or, respectively, transmission channel assigned to it. In the present example of data packet transmission, the measurement values MEAS are transmitted in the reverse transmission direction DWL between the individual data packet transmissions. On the basis of the received measurement values from the current radio cell, it is possible to send further information, such as for example the temporary mobile subscriber identity TMSI and the message DACK for the confirmation of the reception of the respectively transmitted data packets, in the forward transmission direction UPL via the assigned transmission channel TCH/F to their base transceiver station in the mobile radiotelephone network.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. A method for transmitting data using time division multiplex between a mobile radiotelephone network, having a cellular configuration with a plurality of radio cells, and a mobile subscriber station, a forward direction of transmission being from the mobile subscriber station to the network, and a reverse direction of transmission being from the network to the mobile subscriber station, comprising the steps of:

providing a request within the network for transmission of at least one data packet in the reverse transmission direction from the network to the mobile subscriber station;

directly assigning, without a previous transmission of a paging message, a transmission channel of a current radio cell of the plurality of radio cells, the mobile subscriber station being located in the current radio cell, to the mobile subscriber station by the mobile radiotelephone network via a signaling channel.

2. The method according to claim 1, wherein information concerning the current radio cell, in which the mobile subscriber station is located, is one of derived from a data packet that was previously transmitted in a forward transmission direction by the mobile subscriber station or derived from signaling information.

3. The method according to claim 1, wherein a random access is transmitted by the mobile subscriber station via the directly assigned transmission channel in a forward transmission direction during reception of data packets sent in the reverse transmission direction, and wherein the random access is responded to by transmission of measurement values by the mobile radiotelephone network via the radio interface in the reverse transmission direction.

4. The method according to claim 1, wherein transmission of data packets is initiated by the mobile radiotelephone network during or after synchronization of the mobile subscriber station to the directly assigned transmission channel.

5. The method according to claim 1, wherein the direct assignment of the transmission channel for transmission of data packets according to a packet data service is effected by a separate service network node in the mobile radiotelephone network and is communicated to the mobile subscriber station in a signaling message via the signaling channel.

6. An arrangement for transmitting data using time division mulitiplex between a mobile radiotelephone network having a cellular configuration with a plurality of radio cells, and a mobile subscriber station, a forward direction of transmission being from the mobile subscriber station to the network, and a reverse direction of transmission being from the network to the mobile subscriber station, comprising:

a control unit in the mobile radiotelephone network;

a transmission channel of a current radio cell of the plurality of radio cells, the mobile subscriber station being located in the current radio cell, being directly assigned without a previous transmission of a paging message, by the control unit to the mobile subscriber station via a signaling channel, given a request within the network for transmission of at least one data packet in a reverse transmission direction from the network to the mobile subscriber station.

7. The arrangement according to claim 6, wherein the arrangement further comprises, a service network node in the mobile radiotelephone network, said node effecting transmission of data packets via the directly assigned transmission channel according to a packet data service.

8. A method for transmitting data using time division multiplex between a mobile radiotelephone network, having a cellular configuration with a plurality of radio cells, and a mobile subscriber station, a forward direction of transmission being from the mobile subscriber station to the network, and a reverse direction of transmission being from the network to the mobile subscriber station, comprising the steps of:

requesting transmission within the network, of at least one data packet in the reverse transmission direction from the network to the mobile subscriber station;

identifying a current radio cell of the plurality of radio cells, the mobile subscriber station being located in the current radio cell;

assigning, within the network and in response to the request, a transmission channel of the current radio cell of the plurality of radio cells to the mobile subscriber station by the mobile radiotelephone network via a signaling channel, without a previous transmission of a paging message.

9. The method according to claim 8, wherein information concerning the current radio cell, in which the mobile subscriber station is located, is derived from a data packet that was previously transmitted in a forward transmission direction by the mobile subscriber station.

10. The method according to claim 8, wherein information concerning the current radio cell, in which the mobile subscriber station is located, is derived from signaling information.

11. The method according to claim 8, wherein a random access is transmitted by the mobile subscriber station via the directly assigned transmission channel in a forward transmission direction during reception of data packets sent in the reverse transmission direction, and wherein the random access is responded to by transmission of measurement values by the mobile radiotelephone network via the radio interface in the reverse transmission direction.

12. The method according to claim 8, wherein transmission of data packets is initiated by the mobile radiotelephone network during a synchronization of the mobile subscriber station to the directly assigned transmission channel.

13. The method according to claim 8, wherein transmission of data packets is initiated by the mobile radiotelephone network after a synchronization of the mobile subscriber station to the directly assigned transmission channel.

14. The method according to claim 8, wherein the direct assignment of the transmission channel for transmission of data packets according to a packet data service is effected by a separate service network node in the mobile radiotelephone network and is communicated to the mobile subscriber station in a signaling message via the signaling channel.

15. A method for transmitting data using time division multiplex between a mobile radiotelephone network, having a cellular configuration with a plurality of radio cells, and a mobile subscriber station, a forward direction of transmission being from the mobile subscriber station to the network, and a reverse direction of transmission being from the network to the mobile subscriber station, comprising the steps of:

providing a request within the network for transmission of at least one data packet in the reverse transmission direction from the network to the mobile subscriber station;

directly assigning, without a previous transmission of a paging message, a transmission channel of a current radio cell of the plurality of radio cells, the mobile subscriber station being located in the current radio cell, to the mobile subscriber station by the mobile radiotelephone network via a signaling channel, information concerning the current radio cell, in which mobile subscriber station is located, being one of derived from a data packet that was previously transmitted in a forward transmission direction by the mobile subscriber station or derived from signaling information.

16. A method for transmitting data using time division multiplex between a mobile radiotelephone network, having a cellular configuration with a plurality of radio cells, and a mobile subscriber station, a forward direction of transmission being from the mobile subscriber station to the network, and a reverse direction of transmission being from the network to the mobile subscriber station, comprising the steps of:

requesting transmission within the network, of at least one data packet in the reverse transmission direction from the network to the mobile subscriber station;

identifying a current radio cell of the plurality of radio cells, the mobile subscriber station being located in the current radio cell;

assigning, within the network and in response to the request, a transmission channel of the current radio cell of the plurality of radio cells to the mobile subscriber station by the mobile radiotelephone network via a signaling channel, information concerning the current radio cell, in which the mobile subscriber station is located, being derived from a data packet that was previously transmitted in a forward transmission direction by the mobile subscriber station.

* * * * *